United States Patent [19]
Min

[11] Patent Number: 5,757,539
[45] Date of Patent: May 26, 1998

[54] THIN FILM ACTUATED MIRROR ARRAY FOR USE IN AN OPTICAL PROJECTION SYSTEM

[75] Inventor: Yong-Ki Min, Seoul, Rep. of Korea

[73] Assignee: Daewoo Electronics Co. Ltd., Seoul, Rep. of Korea

[21] Appl. No.: 602,928

[22] Filed: Feb. 16, 1996

[30] Foreign Application Priority Data

| Apr. 21, 1995 | [KR] | Rep. of Korea | 95-9394 |
| Apr. 21, 1995 | [KR] | Rep. of Korea | 95-9398 |

[51] Int. Cl.$^6$ ........................ G02B 26/00
[52] U.S. Cl. ........................ 359/290; 359/295; 359/224; 359/846; 310/328
[58] Field of Search ........................ 359/290, 291, 359/295, 221, 222, 224, 846, 848; 310/328, 333, 366

[56] References Cited

U.S. PATENT DOCUMENTS

| 4,441,791 | 4/1984 | Hornbeck | 359/295 |
| 4,662,746 | 5/1987 | Hornbeck . | |
| 5,099,353 | 3/1992 | Hornbeck . | |
| 5,172,262 | 12/1992 | Hornbeck | 359/223 |
| 5,247,222 | 9/1993 | Engle | 310/328 |
| 5,481,396 | 1/1996 | Ji et al. | 359/295 |
| 5,579,179 | 11/1996 | Ji et al. | 359/846 |

FOREIGN PATENT DOCUMENTS 9523352  8/1995  WIPO .

*Primary Examiner*—Loha Ben
*Attorney, Agent, or Firm*—Anderson Kill & Olick P.C.

[57] ABSTRACT

An inventive array of M×N thin film actuated mirrors includes an active matrix, an insulating layer, an etchant stopping layer, and an array of M×N actuating structures. Each of the actuating structures has a tip at a distal end thereof and an etching aperture traversing therethrough, and further includes a first thin film electrode with a horizontal stripe, a thin film electrodisplacive member, a second thin film electrode, an elastic member and a conduit. The horizontal stripe, the tip and the etching aperture are created in order to increase the optical efficiency of each of the thin film actuated mirrors, facilitate the removal of the rinse and allow easy removal of the thin film sacrificial layer, respectively.

17 Claims, 17 Drawing Sheets

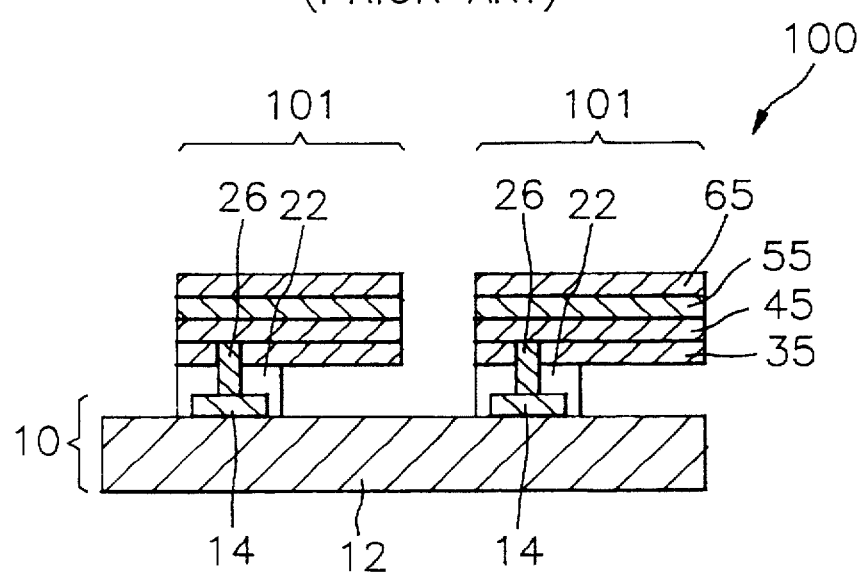

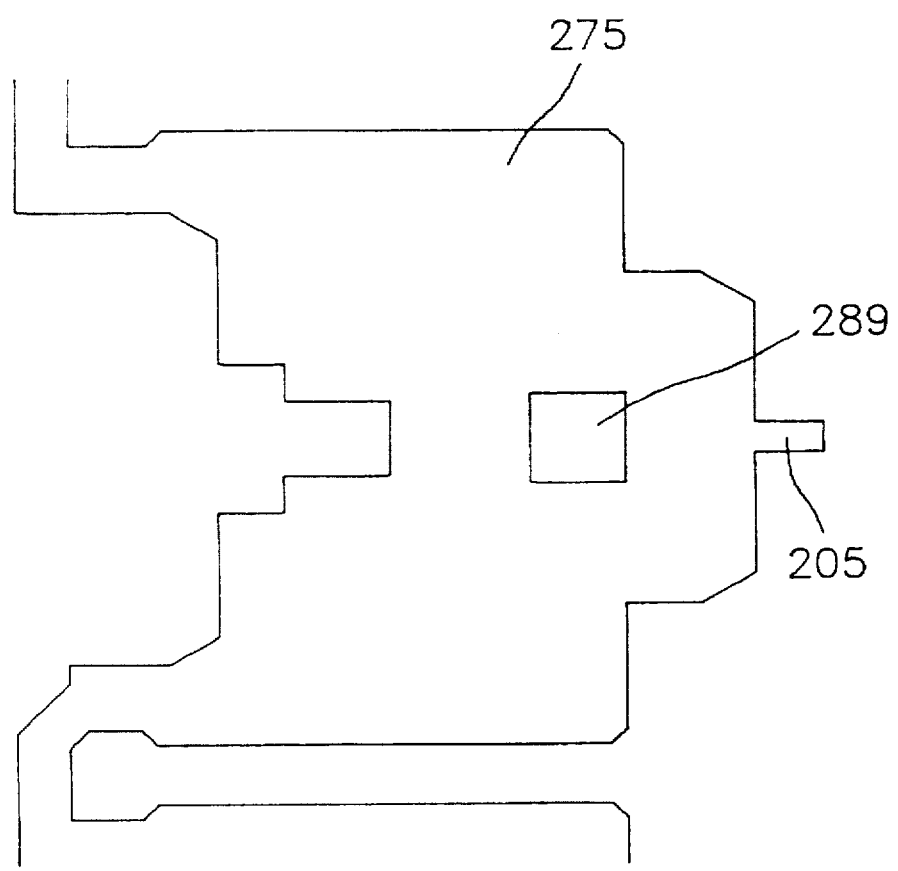

THIN FILM ACTUATED MIRROR ARRAY FOR USE IN AN OPTICAL PROJECTION SYSTEM

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of an active matrix 10 comprising a substrate 12, an array of M×N transistors (not shown) and an array of M×N connecting terminals 14.

In a subsequent step, there is formed on top of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate (PZT), is formed on top of the second thin film layer 40 by using a sputtering method, a CVD method or a Sol-Gel method, as shown in FIG 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the thin film sacrificial layer 24 in the supporting layer 20 is exposed, as shown in FIG. 1D. Each of the second thin film electrodes 45 is electrically connected to a corresponding transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed thin film sacrificial layer 24 in the supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer (not shown). The thin film sacrificial layer 24 in the supporting layer 20 is then removed by using an etching method. Finally, the thin film protection layer is removed to thereby form the array 100 of M×N thin film actuated mirrors 101, as shown in FIG. 1G.

There are certain deficiencies associated with the above described method for the manufacture of the array 100 of M×N thin film actuated mirrors 101. The removal of the thin film sacrificial layer 24 is, generally, followed by a rinsing of an etchant or a chemical used in the removal thereof by using a rinse which, in turn, is removed by evaporating thereof. During the removal of the rinse, the surface tension of the rinse may pull the elastic member 35 down toward the active matrix 10, thereby sticking the elastic member 35 to the active matrix 10, affecting the performance of the respective thin film actuated mirror 101. When enough of the thin film actuated mirrors 101 are thus affected, the overall performance of the array 100 may also degrade.

Furthermore, to remove the thin film sacrificial layer 24 in the supporting layer 20 to create a driving space of each of the thin film actuated mirrors 101 by using an etching method, the etchant or the chemical is inserted through the gaps between the actuated mirror structures 111 covered with the thin film protection layer. However, it takes extremely long time to completely remove the thin film sacrificial layer 24 in the supporting layer 20, and in addition, the thin film sacrificial layer 24 may not be completely removed, leaving remnants thereof in the intended driving space, which will, in turn, degrade the performance of the thin film actuated mirror 101 thus affected. Again, when enough of the thin film actuated mirrors 101 are thus affected, the overall performance of the array 100 may also degrade.

In addition to the above described deficiencies in the method for the manufacture thereof, the array 100 thus prepared has a major shortcoming, the shortcoming being the overall optical efficiency. When each of the thin film actuated mirrors 101 deforms in response to an electric field applied across the thin film electrodisplacive member 55 thereof, the first thin film electrode 65 attached thereto, which also acts as a mirror, also deforms to thereby, instead of creating a planar top surface, create a curved top surface from which the light beams are reflected. As a result, the overall optical efficiency of the array 100 decreases.

SUMMARY OF THE INVENTION

It is, therefore, a primary object of the present invention to provide an array of M×N thin film actuated mirrors, each of the thin film actuated mirrors having a novel structure which will facilitate the prevention of the occurrence of the elastic member sticking to the active matrix during the removal of the rinse in the manufacturing process thereof.

It is another object of the present invention to provide an array of M×N thin film actuated mirrors, each of the thin film actuated mirrors having a novel structure which will facilitate a complete and more efficient removal of the thin film sacrificial layer in the manufacturing process thereof.

It is still another object of the present invention to provide an array of M×N thin film actuated mirrors having an improved optical efficiency.

It is further object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix including a substrate, an array of M×N transistors and an array of M×N connecting terminals, wherein each of the connecting terminals is electrically connected to a corresponding transistor in the array of transistors; a passivation layer formed on top of the active matrix; an etchant stopping layer formed on top of the passivation layer; and an array of M×N actuating structures, each of the actuating structures being provided with a proximal and a distal ends, each of the actuating structures having a tip at the distal end thereof and an etching aperture traversing therethrough, each of the actuating structures including a first thin film electrode, a thin film electrodisplacive member, a second thin film electrode, an elastic member and a conduit, wherein the first thin film electrode is located on top of the thin film electrodisplacive member and is divided into an actuating and a light reflecting portions by a horizontal stripe, the horizontal stripe disconnecting electrically the actuating and the light reflecting portions thereof, the actuating portion thereof being electrically connected to ground, thereby allowing the actuating portion and the light reflecting portion thereof to function as a mirror and a bias electrode and as a mirror, respectively, the thin film electrodisplacive member is positioned on top of the second thin film electrode, the second thin film electrode is formed on top of the elastic member, the second thin film electrode being electrically connected to EL corresponding transistor through the conduit and the connecting terminal, and being disconnected electrically from the second thin film electrode in other thin film actuated mirrors, to thereby allow it to function as a signal electrode, the elastic member is located at bottom of the second thin film electrode and a bottom portion at the proximal end thereof is attached on top of the active matrix with the etchant stopping and the passivation layers partially intervening therebetween, thereby cantilevering the actuating structure, and the conduit extends from top of the thin film electrodisplacive member to top of a corresponding connecting terminal, connecting electrically the second thin film electrode to the connecting terminal.

In accordance with another aspect of the present invention, there is provided a method for manufacturing an array of M×N thin film actuated mirrors, wherein M and N are integers and each of the thin film actuated mirrors corresponds to a pixel, for use in an optical projection system, the method comprising the steps of: providing an active matrix including a substrate, an array of M×N connecting terminals and an array of M×N transistors, wherein each of the connecting terminals is electrically connected to a corresponding transistor in the array of transistors; depositing a passivation layer on top of the active matrix; depositing an etchant stopping layer on top of the passivation layer; depositing a thin film sacrificial layer on top of the etchant stopping layer, wherein the thin film sacrificial layer has a top surface; flattening the top surface of the thin film sacrificial layer; creating an array of M×N pairs of empty cavities in the thin film sacrificial layer in such a way that one of the empty slots in each pair encompasses one of the connecting terminals; depositing an elastic layer and a second thin film layer, successively, on top of the thin film sacrificial layer including the empty cavities; iso-cutting the second thin film layer into an array of M×N second thin film electrodes, wherein each of the second thin film electrodes is electrically disconnected from one another; depositing a thin film electrodisplacive layer and a first thin film layer, successively, on top of the array of M×N second thin film electrodes to thereby form a multiple layered structure; patterning the multiple layered structure into an array of M×N actuated mirror structures, until the thin film sacrificial layer is exposed, in such a way that each of the actuated mirror structures has a tip at a distal end thereof and an etching aperture traversing therethrough, each of the actuated mirror structures including a first thin film electrode, a thin film electrodisplacive member, a second thin film electrode and an elastic member, wherein the first thin film electrode is divided into an actuating and a light reflecting portions by a horizontal stripe, the horizontal stripe disconnecting electrically the actuating and the light reflecting portion thereof, the actuating portion thereof being electrically connected to ground; creating an array of M×N holes, each of the holes extending from top of the thin film electrodisplacive member to top of a corresponding connecting terminal; filling each of the holes with a metal to thereby form a conduit therein, to thereby form an array of M×N semifinished actuated mirrors; semi-dicing the active matrix by forming an incision at the active matrix; covering completely each of the semifinished actuated mirrors with a thin film protection layer; removing the thin film sacrificial layer using an etchant or a chemical, wherein the etchant or the chemical is inserted into the etching aperture in each of the semifinished actuated mirrors and gaps between the semifinished actuated mirrors; removing the thin film protection layer; and dicing completely the active matrix into a desired shape to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIGS. 1A to 1G are schematic cross sectional views illustrating a method for the manufacture of an array of M×N thin film actuated mirrors previously disclosed;

FIGS. 4A to 4D are top views of the thin film layers constituting each of the thin film actuated mirrors shown in FIG. 2.

DETAILED DESCRIPTION OF THE PREFERRED EMBODIMENTS

Figure 1A:
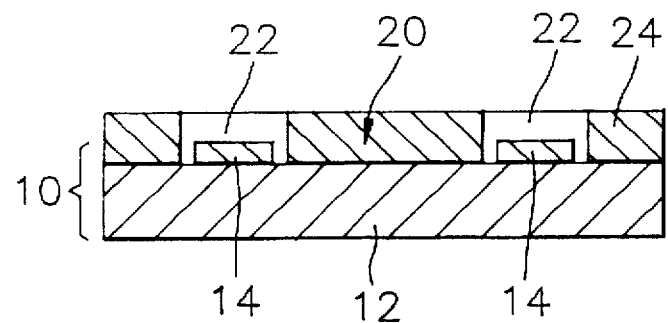
Figure 1B:
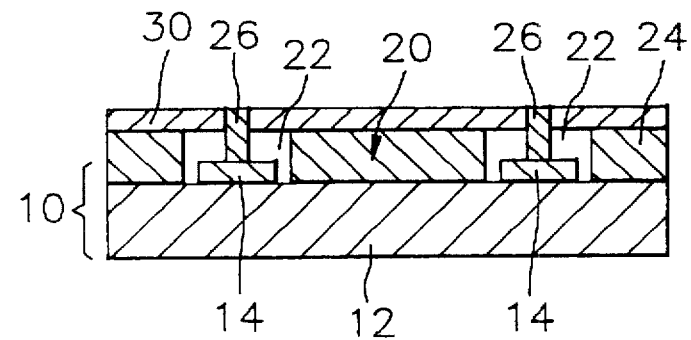
Figure 1C:
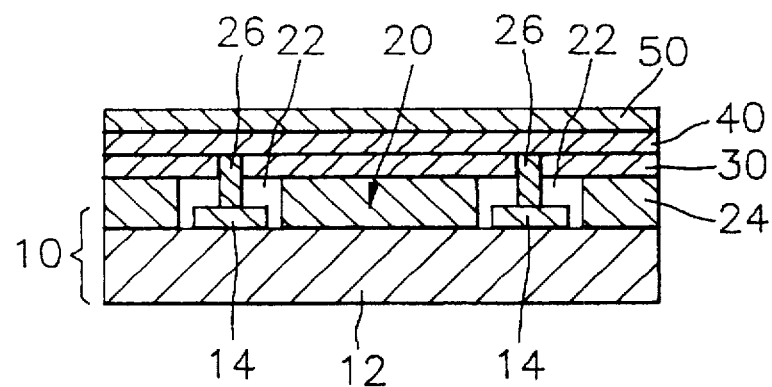
Figure 1D:
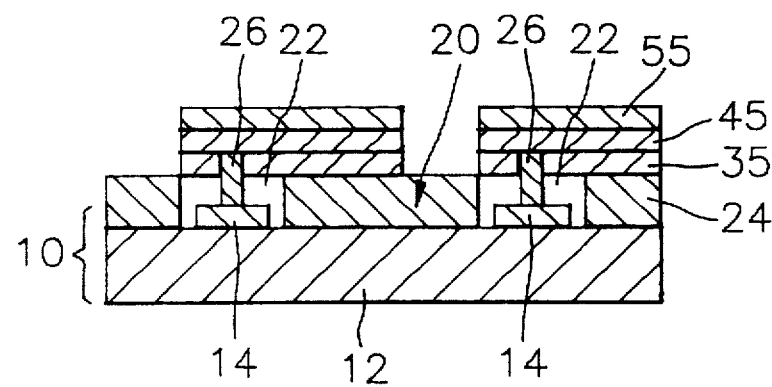
Figure 1E:
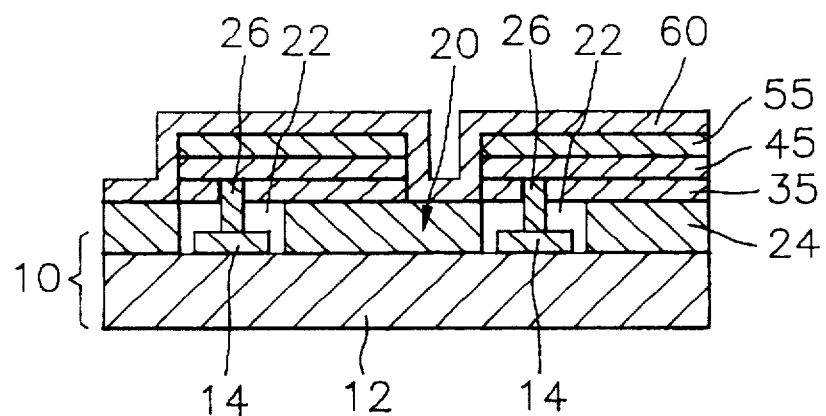
Figure 1F:
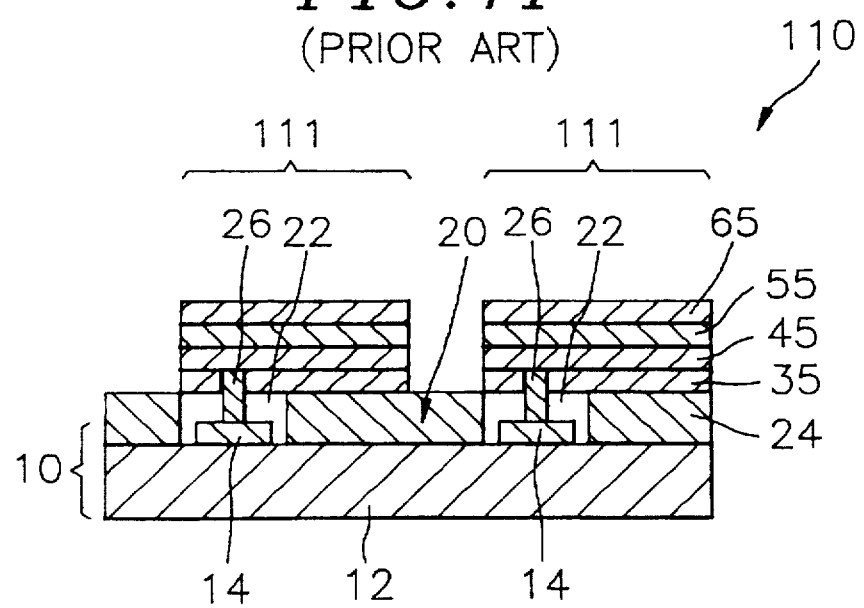

There are provided in FIGS. 2, 3A to 3N and 4A to 4D a cross sectional view setting forth an array 300 of M×N thin film actuated mirrors 301, wherein M and N are integers, for use in an optical projection system, schematic cross sectional views illustrating a method for manufacturing the array 300 of M×N thin film actuated mirrors 301, and top views of the thin film layers constituting each of the thin film actuated mirrors 301, in accordance with the present invention, respectively. It should be noted that like parts appearing in FIGS. 2, 3A to 3N and 4A to 4D are represented by like reference numerals.

Figure 2:
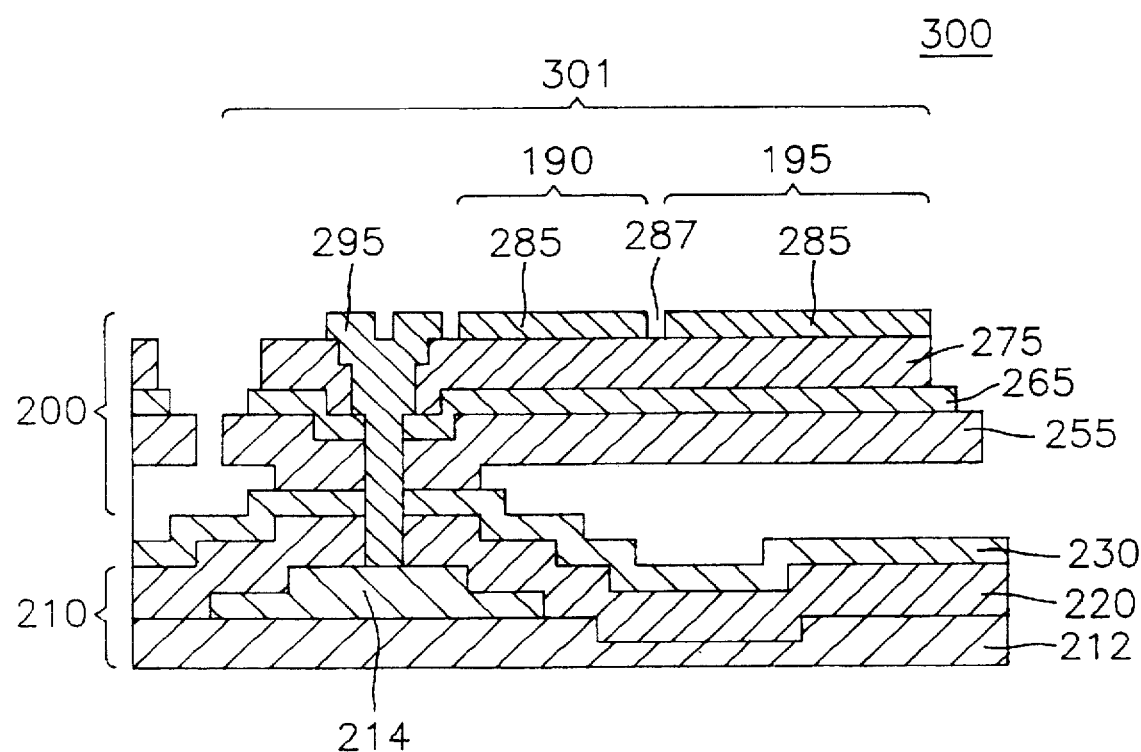
FIG. 2 is a cross sectional view setting forth an array of M×N thin film actuated mirrors in accordance with the present invention.

In FIG. 2, there is provided a cross sectional view setting forth an array 300 of M×N thin film actuated mirrors 301 in accordance with the present invention, the array 300 comprising an active matrix 210, a passivation layer 220, an etchant stopping layer 230 and an array of M×N actuating structures 200.

The active matrix 210 includes a substrate 212, an array of M×N transistors (not shown) and an array of M×N connecting terminals 214. Each of the connecting terminals 214 is electrically connected to a corresponding transistor in the array of transistors.

The passivation layer 220, made of, e.g., a phosphorsilicate glass (PSG) or silicon nitride, and having a thickness of 0.1-2 μm, is located on top of the active matrix 210.

The etchant stopping layer 230, made of silicon nitride, and having a thickness of 0.1-2 μm, is positioned on top of the passivation layer 220.

Each of the actuating structures 200 has a distal and a proximal ends, and further includes a tip (not shown) at the distal end thereof and an etching aperture (not shown) traversing therethrough. Each of the actuating structures 200 is provided with a first thin film electrode 285, a thin film electrodisplacive member 275, a second thin film electrode 265, an elastic member 255 and a conduit 295. The first thin film electrode 285 made of an electrically conducting and light reflecting material, e.g., aluminum (Al) or silver (Ag), is located on top of the thin film electrodisplacive member 275, and is divided into an actuating and a light reflecting portions 190, 195 by a horizontal stripe 287, wherein the horizontal stripe 287 disconnects electrically the actuating and the light reflecting portions 190, 195. The actuating portion 190 thereof is electrically connected to ground, thereby functioning as a mirror as well as a common bias electrode. The light reflecting portion 195 thereof functions as the mirror. The thin film electrodisplacive member 275, made of a piezoelectric material, e.g., lead zirconium titanate (PZT), or- an electrostrictive material, e.g., lead magnesium niobate (PMN), is placed on top of the second thin film electrode 265. The second thin film electrode 265, made of an electrically conducting material, e.g., platinum/tantalum (Pt/Ta), is located on top of the elastic member 255, and is electrically connected to a corresponding transistor through the conduit 295 and the connecting terminal 214 and is disconnected electrically from the second thin film electrode 265 in other thin film actuated mirrors 301, thereby allowing it to function as a signal electrode. The elastic member 255, made of a nitride, e.g., silicon nitride, is positioned below the second thin film electrode 265. A bottom portion at the proximal end thereof is attached to top of the active matrix 210, with the etchant stopping 230 and the passivation layers 220 partially intervening therebetween, thereby cantilevering the actuating structure 200. The conduit 295, made of a metal, e.g., tungsten (VI), extends from top of the thin film electrodisplacive member 275 to top of a corresponding connecting terminal 214, thereby connecting electrically the second thin film electrode 265 to the connecting terminal 214. The conduit 295 extending downward from top of the thin film electrodisplacive member 275 and the first thin film electrode 285 placed on top of the thin film electrodisplacive member 275 in each of the thin film actuated mirrors 301 are not electrically connected to each other.

Figure 3A:
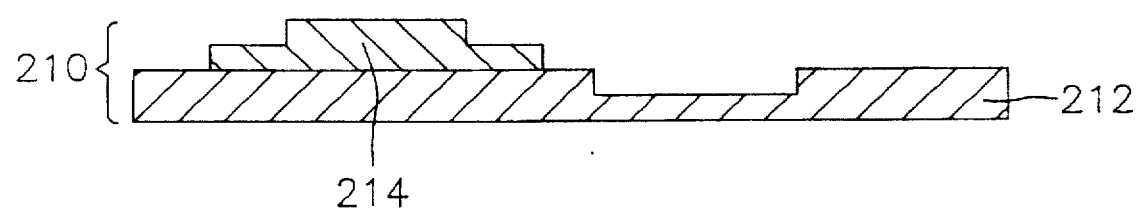
FIGS. 3A to 3N are schematic cross sectional views illustrating a method for manufacturing the array of M×N thin film actuated mirrors shown in FIG. 2.
Figure 3B:
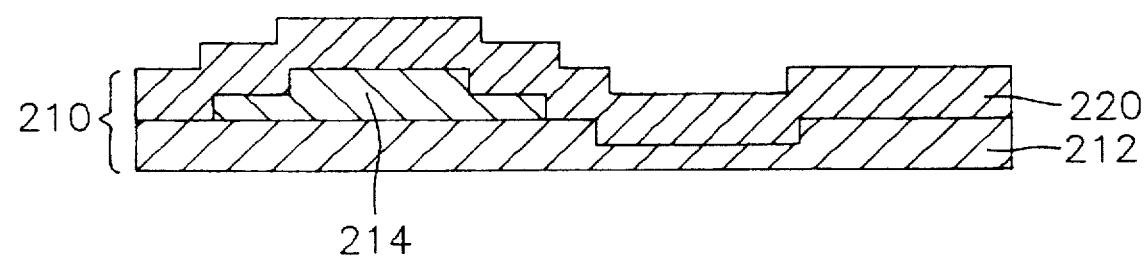
Figure 3C:
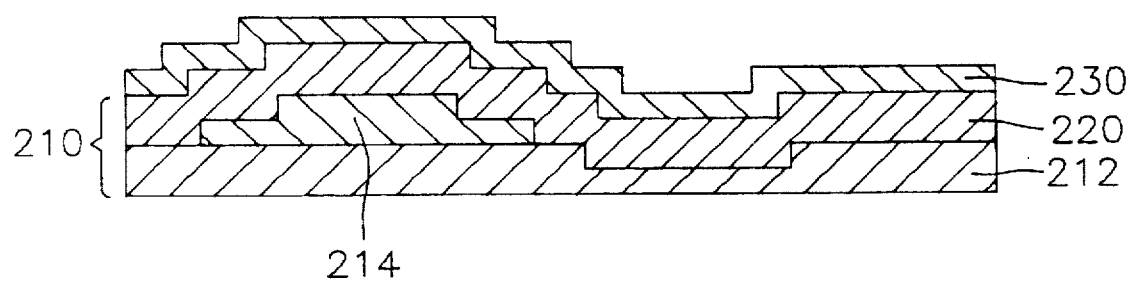
Figure 3D:
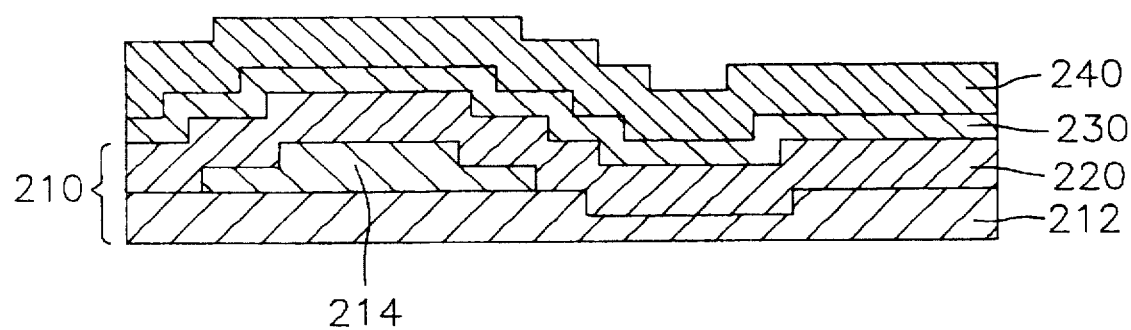
Figure 3E:
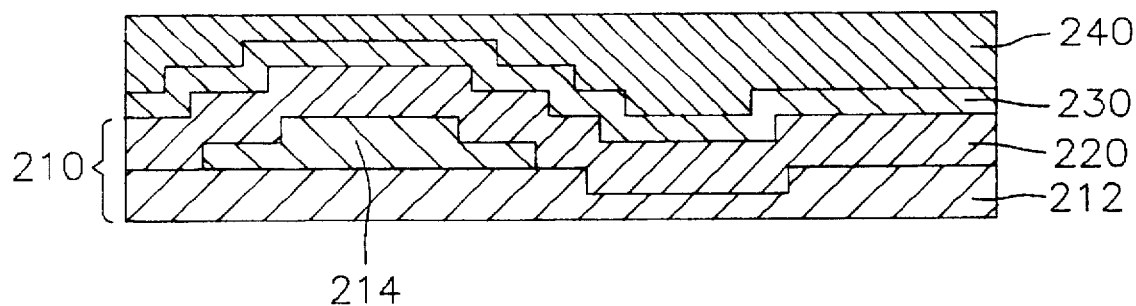
Figure 3F:
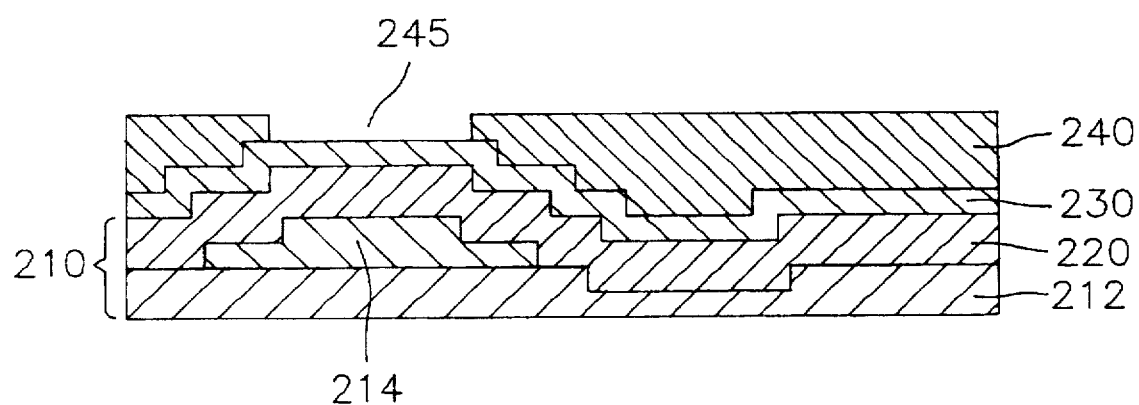
Figure 3G:
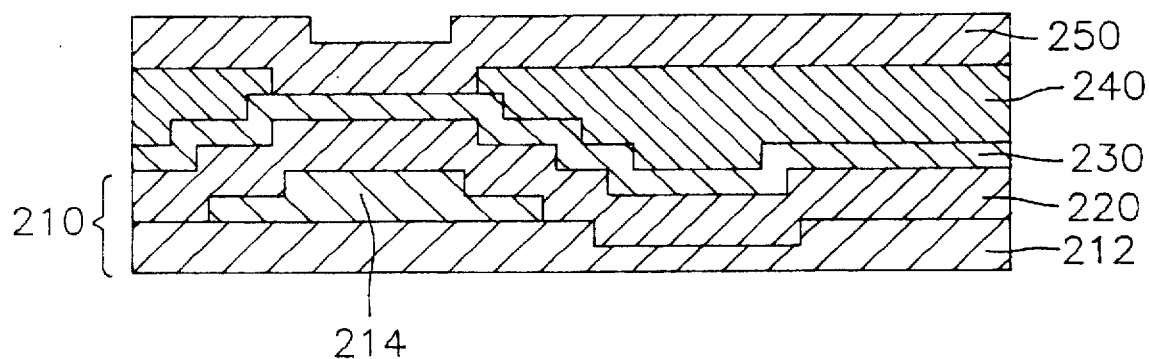
Figure 3H:
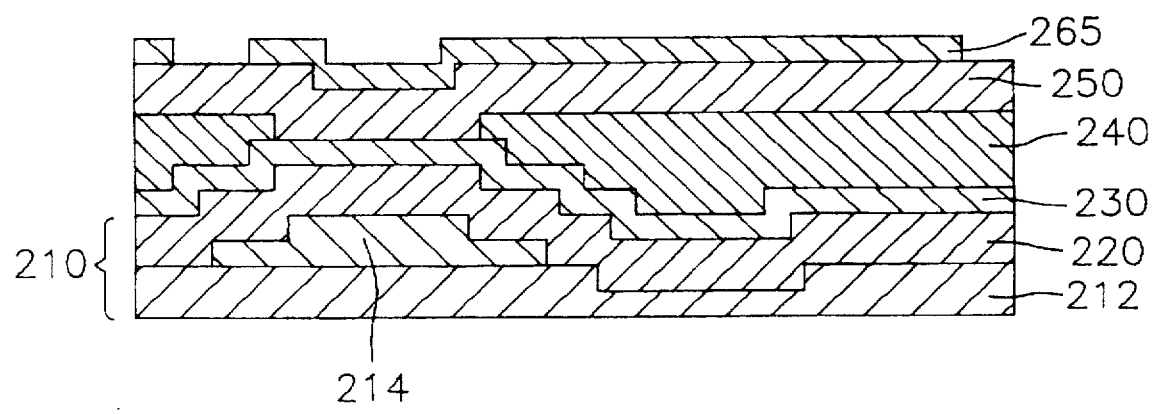
Figure 3I:
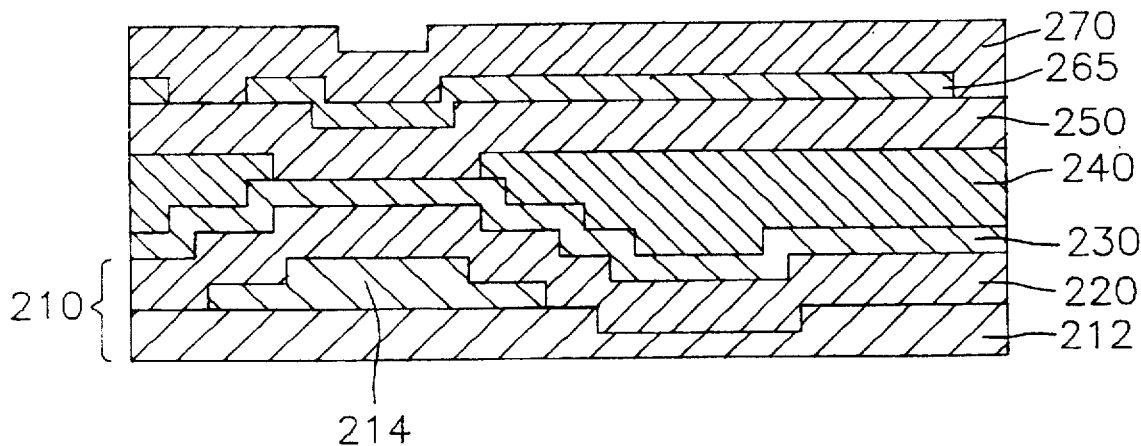
Figure 3J:
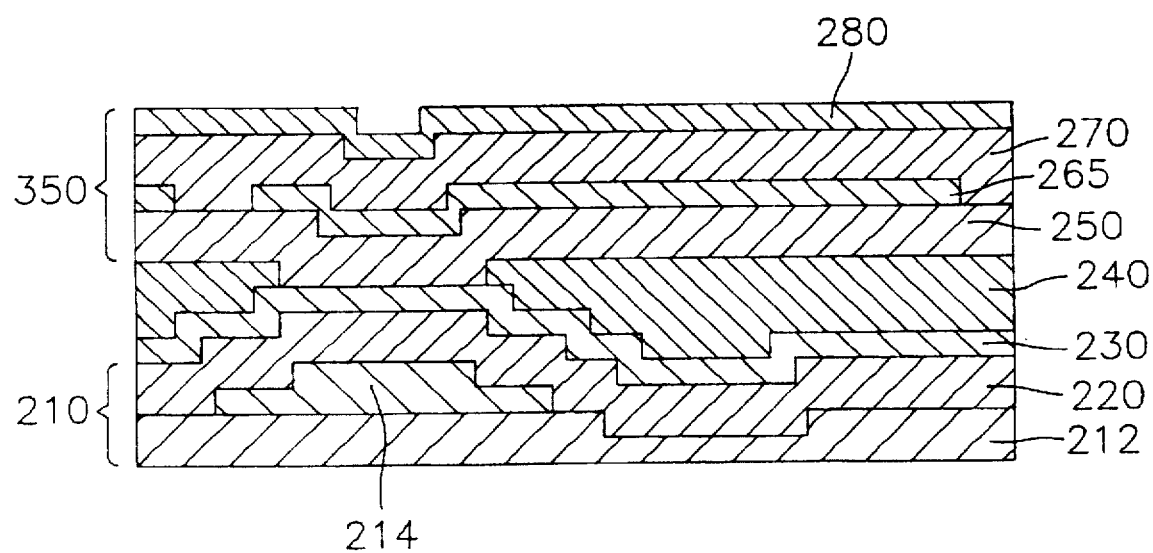
Figure 3K:
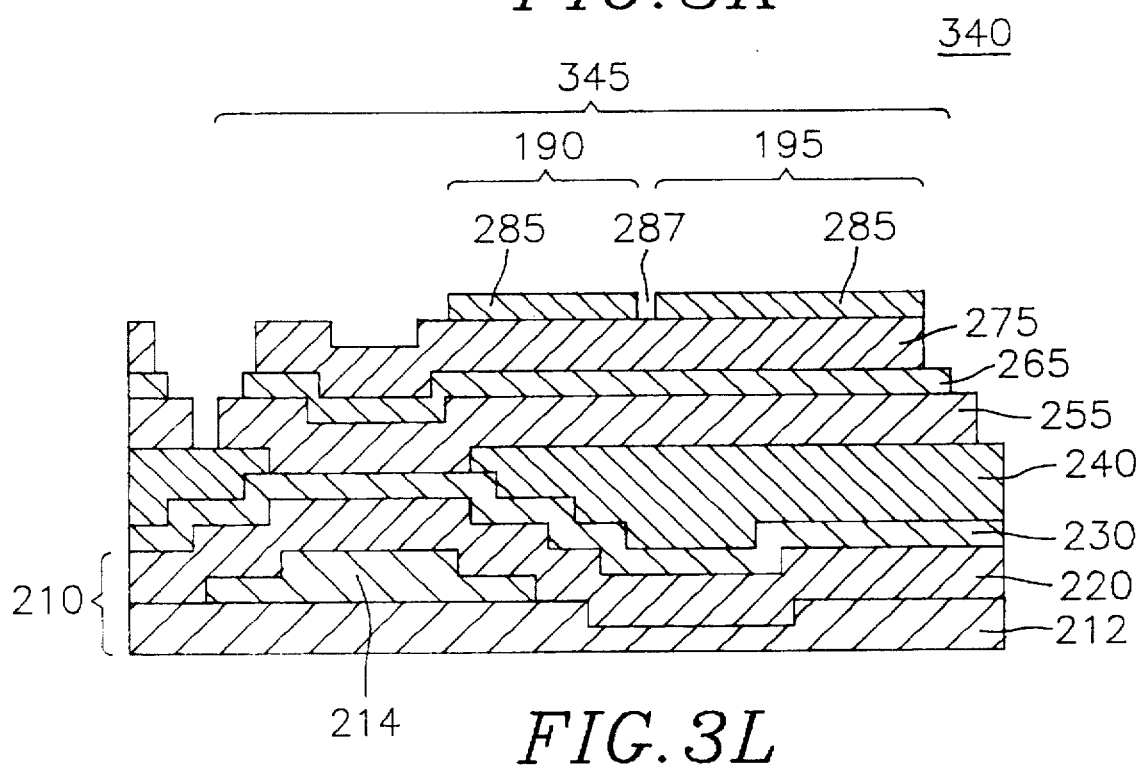
Figure 3L:
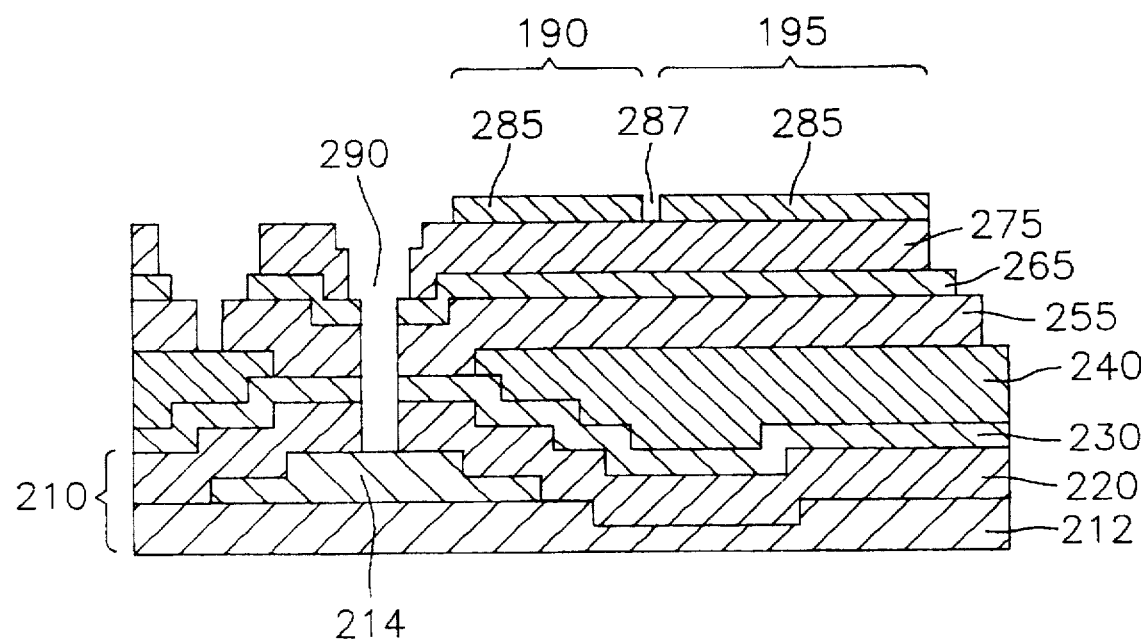
Figure 3M:
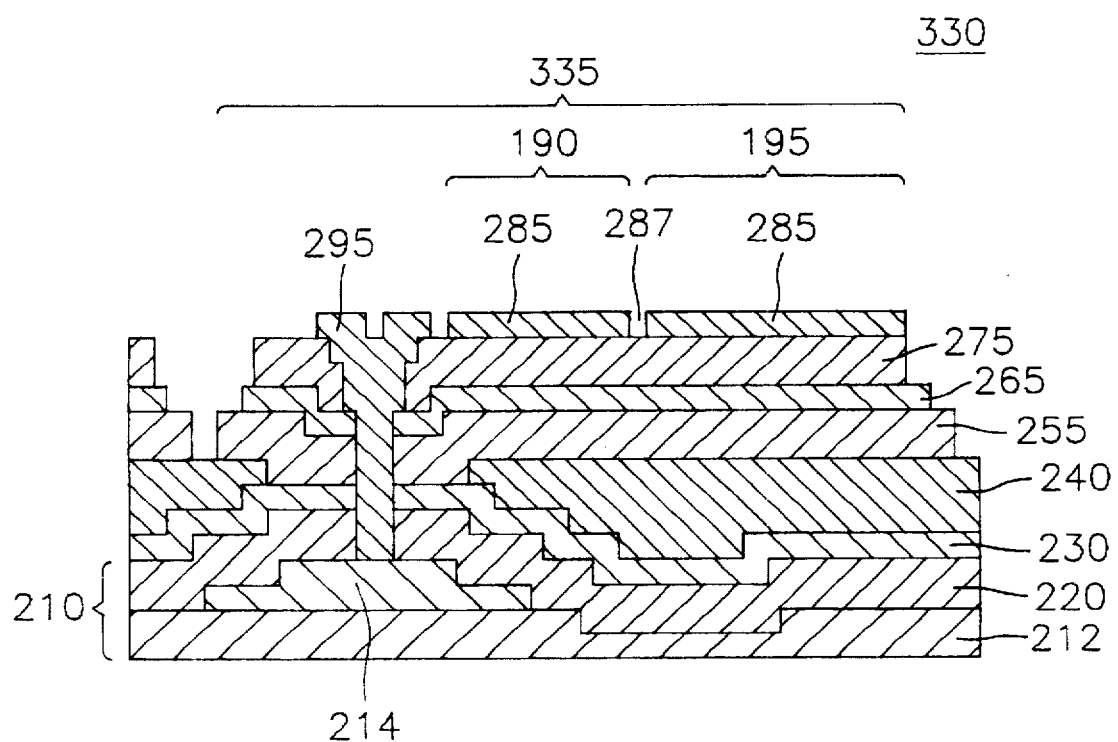
Figure 3N:
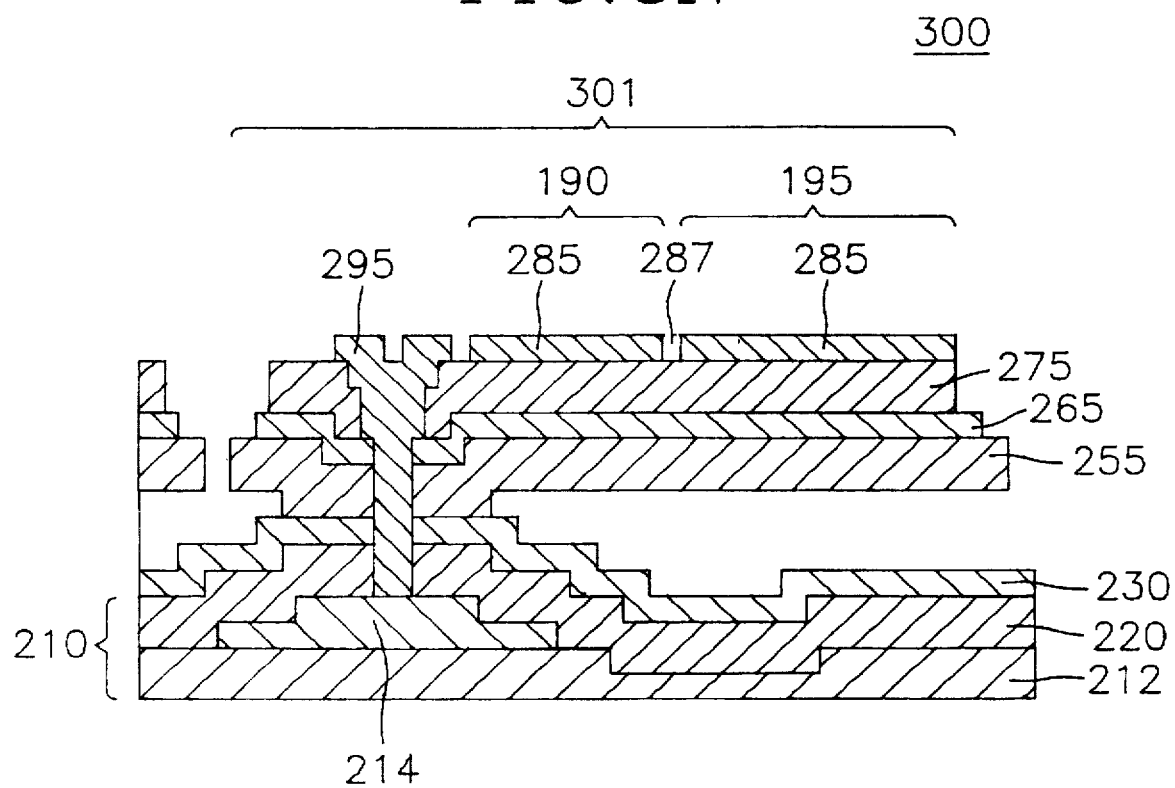

In FIGS. 3A to 3N, there are provided schematic cross sectional views illustrating a method for the manufacture of the array 300 of M×N thin film actuated mirrors 301 shown in FIG. 2.

The process for the manufacture of the array 300 begins with the preparation of an active matrix 210 including a substrate 212, an array of M×N connecting terminals 214 and an array of M×N transistors (not shown), as shown in FIG. 3A. The substrate 212 is made of an insulating material, e.g., Si-wafer. Each of the connecting terminals 214 is electrically connected to a corresponding transistor in the array of transistors.

In a subsequent step, there is formed a passivation layer 220, made of, e.g., PSG or silicon nitride, and having a thickness of 0.1-2 μm, on top of the active matrix 210 by using, e.g., a CVD or a spin coating method, as shown in FIG. 3B.

Thereafter, an etchant stopping layer 230, made of silicon nitride, and having a thickness of 0.1-2 μm, is deposited on top of the passivation layer 220 by using, e.g., a sputtering or a CVD method, as shown in FIG. 3C.

Then, a thin film sacrificial layer 240 is formed on top of the etchant stopping layer 230, as shown in FIG. 3D. The thin film sacrificial layer 240 is formed by using a sputtering or an evaporation method if the thin film sacrificial layer 240 is made of a metal, a CVD or a spin coating method if the thin film sacrificial layer 240 is made of a PSG, or a CVD method if the thin film sacrificial layer 240 is made of a poly-Si. The thin film sacrificial layer 240 has a top surface.

Next, the top surface of the thin film sacrificial layer 240 is made flat by using a spin on glass (SOG) method or a chemical mechanical polishing (CMP) method, followed by a scrubbing method, as shown in FIG. 3E.

Subsequently, an array of M×N pairs of empty cavities 245 is created in the thin film sacrificial layer 240 in such a way that one of the empty cavities 245 in each pair encompasses one of the connecting terminals 214 by using a dry or an wet etching method, as shown in FIG. 3F.

In a next step, an elastic layer 250, made of a nitride, e.g., silicon nitride, and having a thickness of 0.1–2 μm, is deposited on top of the thin film sacrificial layer 240 including the empty cavities 245 by using a CVD method, as shown in FIG. 3G. During the deposition, the stress inside the elastic layer 250 is controlled by changing the gas ratio as a function of time.

Thereafter, a second thin film layer (not shown), made of an electrically conducting material, e.g., Pt/Ta, and having a thickness of 0.1–2 μm, is formed on top of the elastic layer 250 by using a sputtering or a vacuum evaporation method. The second thin film layer is then iso-cut into an array of M×N second thin film electrodes 265 by using a dry etching method, wherein each of the second thin film electrodes 265 is electrically disconnected from other second thin film electrodes 265, as shown in FIG. 3H.

Then, a thin film electrodisplacive layer 270, made of a piezoelectric material, e.g., PZT, or an electrostrictive material, e.g., PMf, and having a thickness of 0.1–2 μm, is deposited on top of the array of M×N second thin film electrodes 265 by using an evaporation, a Sol-Gel, a sputtering or a CVD method, as shown in FIG. 3I. The thin film electrodisplacive layer 270 is then heat treated to allow a phase transition to take place by using a rapid thermal annealing (RTA) method.

Since the thin film electrodisplacive layer 270 is sufficiently thin, there is no need to pole it in case it is made of a piezoelectric material: for it can be poled with the electric signal applied during the operation of the thin film actuated mirrors 301.

Subsequently, a first thin film layer 280, made of an electrically conducting and light reflecting material, e.g., aluminum (Al) or silver (Ag), and having a thickness of 0.1–2 μm, is formed on top of the thin film electrodisplacive layer 270 by using a sputtering or a vacuum evaporation method, thereby forming a multiple layered structure 350, as shown in FIG. 3J.

In an ensuing step, as shown in FIG. 3K, the multiple layered structure 350 is patterned into an array 340 of M×N actuated mirror structures 345 by using a photolithography or a laser trimming method, until the thin film sacrificial layer 240 is exposed, in such a way that each of the actuated mirror structures 345 has a tip (not shown) at a distal end thereof and an etching aperture (not shown) traversing therethrough. Each of the actuated mirror structures 345 includes a first thin film electrode 285, a thin film electrodisplacive member 275, the second thin film electrode 265 and an elastic member 255. The first thin film electrode 285 is divided into an actuating and a light reflecting portions 190, 195 by a horizontal stripe 287, wherein the horizontal stripe 287 disconnects electrically the actuating and the light reflecting portions 190, 195 thereof, the actuating portion 190 thereof being electrically connected to ground.

In a subsequent step, an array of M×N holes 290 is created by using an etching method, wherein each of the holes extends from top of the thin film electrodisplacive member 275 to top of a corresponding connecting terminal 214, as shown in FIG. 3L.

In a following step, the conduit 295 is formed by filling each of the holes 290 with a metal, e.g., tungsten (W), using, e.g., a lift-off method, thereby forming an array 330 of M×N semifinished actuated mirrors 335, as shown in FIG. 3M.

After the above step, an incision (not shown) having a depth of approximately one third of the thickness of the active matrix 210 is made by using a photolithography method. This step is also known as semi-dicing.

The preceeding step is then followed by completely covering each of the semifinished actuated mirrors 335 with a thin film protection layer (not shown).

The thin film sacrificial layer 240 is then removed by using a wet etching method using an etchant or a chemical, e.g., hydrogen fluoride (HF) vapor, wherein the etchant or the chemical is inserted through the etching aperture in each of the semifinished actuated mirrors 335 and gaps between the semifinished actuated mirrors 335 to thereby form a driving space of each of the thin film actuated mirrors 301.

Next, the thin film protection layer is removed.

Finally, the active matrix 210 is completely diced into a desired shape, by using a photolithography or a laser trimming method, to thereby form the array 300 of M×N thin film actuated mirrors 301, as shown in FIG. 3N.

Figure 4A:
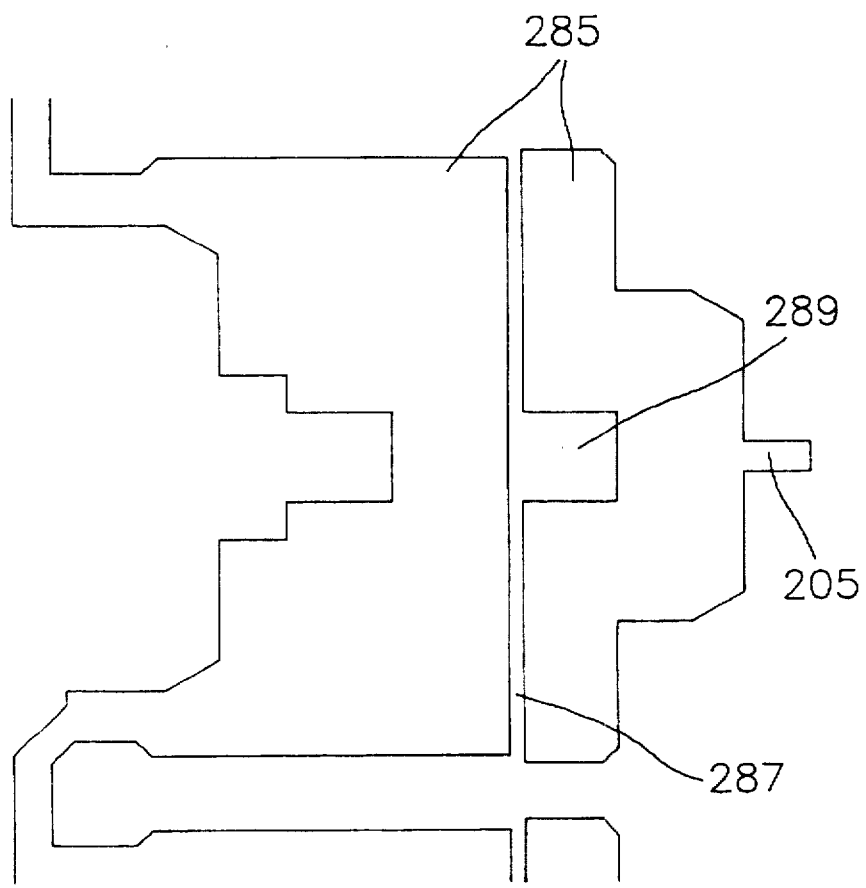
Figure 4C:
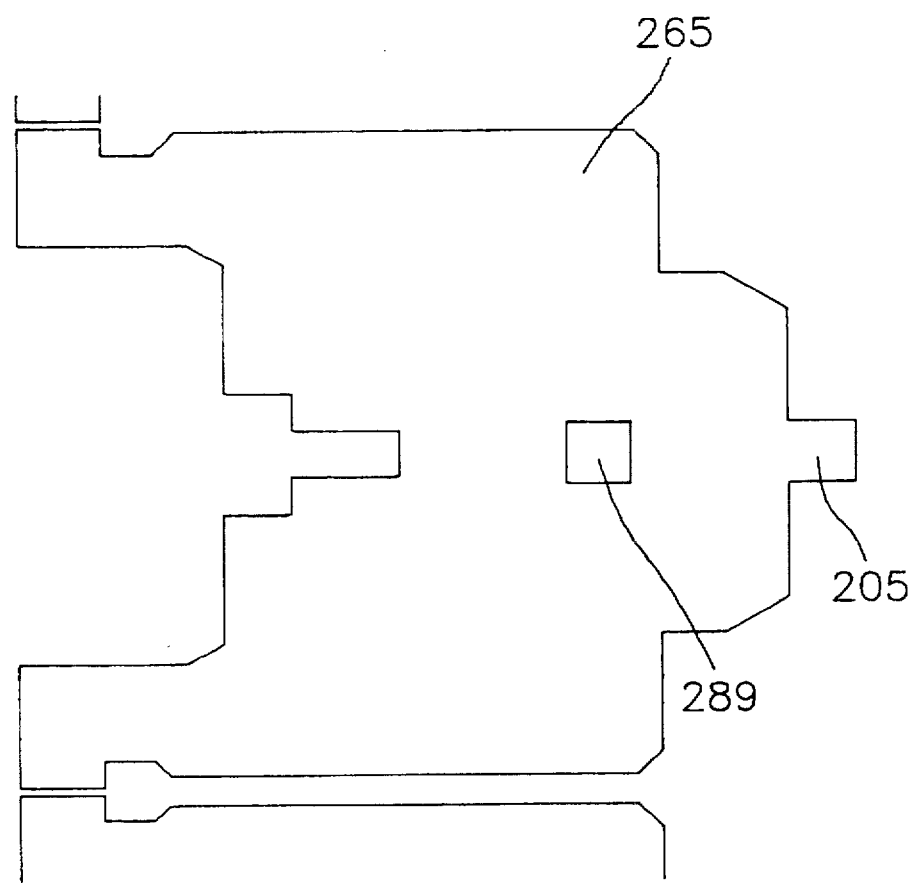
Figure 4D:
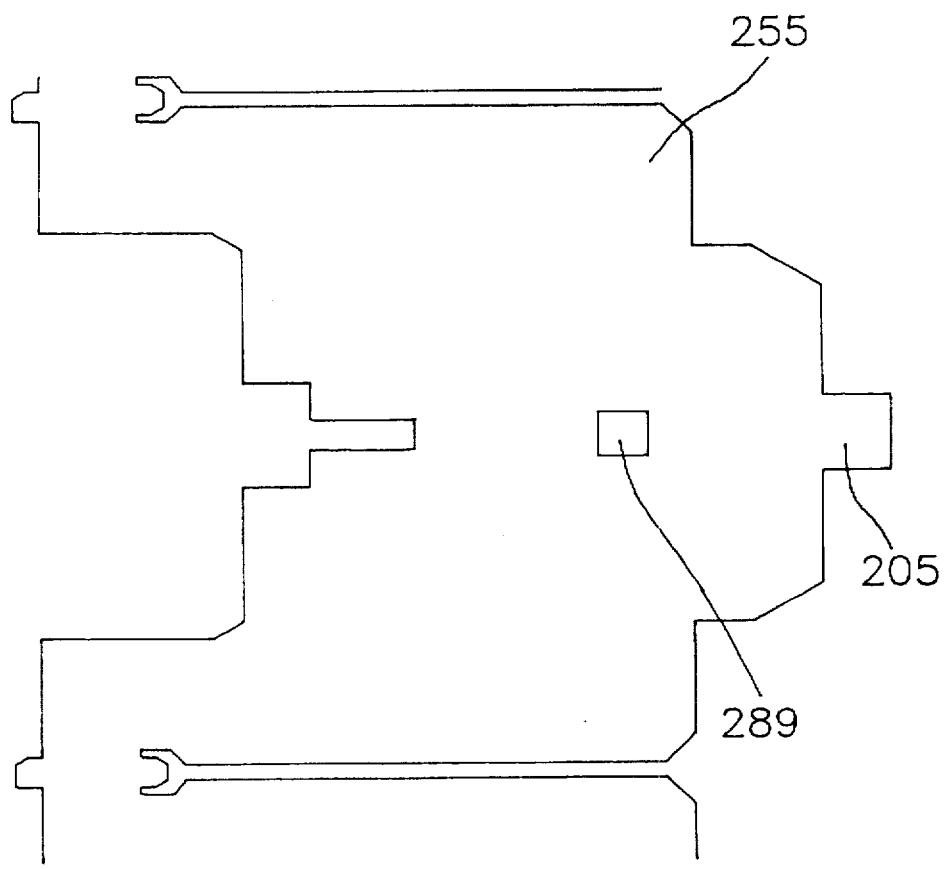

In FIGS. 4A to 4D, there are provided, respectively, top views of the first thin film electrode 285, the thin film electrodisplacive member 275, the second thin film electrode 265 and the elastic member 255, constituting each of the thin film actuated mirrors 301 in accordance with the present invention, respectively. Each of the thin film layers has a tip 205 at a distal end thereof and an etching aperture 289. As illustrated in FIG. 4C, the second thin film electrode 265 is electrically disconnected from the second thin film electrode 265 in other thin film actuated mirrors 301 in the array 300.

In the inventive array 300 of M×N thin film actuated mirrors 301 and method for the manufacture thereof, the first thin film electrodes 285 in each of the thin film actuated mirrors 301 is divided into the actuating and the light reflecting portions 190, 195 by the horizontal stripe 287, and during the operation of each of the thin film actuated mirrors 301, only the portions of the thin film electrodisplacive member 275, the second thin film electrode 265 and the elastic member 255 located below the actuating portion 190 of the first thin film electrode 285 deform, while the remaining portions stay planar, allowing the light reflecting portion 195 to reflect more efficiently the light beam impinging thereonto, thereby increasing the optical efficiency of the array 300.

Furthermore, the removal of the thin film sacrificial layer 240 is, generally, followed by a rinsing of the etchant or the chemical used in the removal thereof by using a rinse which, in turn, be removed by evaporating thereof. During the removal of the rinse, the rinse gathers at the tip 205 of each of the thin film actuated mirrors 301, facilitating an easy removal thereof, thereby reducing the possibility of the elastic member 255 sticking to the active matrix 210, which will, in turn, help in preserving the structural integrity and the performance of the thin film actuated mirrors 301, increasing the overall performance of the array 300.

In addition, since the etchant or the chemical used in the thin film sacrificial layer 240 is inserted through the etching apertures 289 as well as the gaps between the actuating structures 200, the thin film sacrificial layer 240 may be removed in more efficient and complete manner.

It should be mentioned that, even though, the thin film actuated mirrors 301 and the method for manufacturing thereof are described with respect to the case wherein each of the thin film actuated mirrors has a unimorph structure, the ideas presented above can be equally well applied to a case wherein each of the thin film actuated mirrors has a bimorph structure, for the latter case just involves an additional electrodisplacive and electrode layers and formation thereof.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate, an array of M×N transistors and an array of M×N connecting terminals, wherein each of the connecting terminals is electrically connected to a corresponding transistor in the array of transistors;

a passivation layer formed on top of the active matrix;

an etchant stopping layer formed on top of the passivation layer; and an array of M×N actuating structures, each of the actuating structures being provided with a proximal and a distal ends, each of the actuating structures having a tip at the distal end thereof and an etching aperture traversing therethrough, each of the actuating structures including a first thin film electrode, a thin film electrodisplacive member, a second thin film electrode, an elastic member and a conduit, wherein the first thin film electrode is located on top of the thin film electrodisplacive member and is divided into an actuating and a light reflecting portions by a horizontal stripe, the horizontal stripe disconnecting electrically the actuating and the light reflecting portions thereof, the actuating portion thereof being electrically connected to ground, thereby allowing the actuating portion and the light reflecting portion thereof to function as a mirror and a bias electrode and as a mirror, respectively, the thin film electrodisplacive member is positioned on top of the second thin film electrode, the second thin film electrode is formed on top of the elastic member, the second thin film electrode being electrically connected to a corresponding transistor through the conduit and the connecting terminal, and being disconnected electrically from the second thin film electrode in other thin film actuated mirrors, to thereby allow it to function as a signal electrode, the elastic member is located at bottom of the second thin film electrode and a bottom portion at the proximal end thereof is attached on top of the active matrix with the etchant stopping and the passivation layers partially intervening therebetween, thereby cantilevering the actuating structure, and the conduit extends from top of the thin film electrodisplacive member to top of a corresponding connecting terminal, connecting electrically the second thin film electrode to the connecting terminal.

2. The array of claim 1, wherein the passivation layer is made of a phosphor-silicate glass (PSG) or silicon nitride.

3. The array of claim 1, wherein the etchant stopping layer is made of silicon nitride.

4. A method for manufacturing an array of M×N thin film actuated mirrors, wherein M and N are integers and each of the thin film actuated mirrors corresponds to a pixel, for use in an optical projection system, the method comprising the steps of:

providing an active matrix including a substrate, an array of M×N connecting terminals and an array of M×N transistors, wherein each of the connecting terminals is electrically connected to a corresponding transistor in the array of transistors;

depositing a passivation layer on top of the active matrix;

depositing an etchant stopping layer on top of the passivation layer;

depositing a thin film sacrificial layer on top of the etchant stopping layer, wherein the thin film sacrificial layer has a top surface;

flattening the top surface of the thin film sacrificial layer;

creating an array of M×N pairs of empty cavities in the thin film sacrificial layer in such a way that one of the empty cavities in each pair encompasses one of the connecting terminals;

depositing an elastic layer and a second thin film layer, successively, on top of the thin film sacrificial layer including the empty cavities;

iso-cutting the second thin film layer into an array of M×N second thin film electrodes, wherein each of the second thin film electrodes is electrically disconnected from one another;

depositing a thin film electrodisplacive layer and a first thin film layer, successively, on top of the array of M×N second thin film electrodes to thereby form a multiple layered structure;

patterning the multiple layered structure into an array of M×N actuated mirror structures, until the thin film sacrificial layer is exposed, in such a way that each of the actuated mirror structures has a tip at a distal end thereof and an etching aperture traversing therethrough, each of the actuated mirror structures including a first thin film electrode, a thin film electrodisplacive member, a second thin film electrode and an elastic member, wherein the first thin film electrode is divided into an actuating and a light reflecting portions by a horizontal stripe, the horizontal stripe disconnecting electrically the actuating and the light reflecting portion thereof, the actuating portion thereof being electrically connected to ground;

creating an array of M×N holes, each of the holes extending from top of the thin film electrodisplacive member to top of a corresponding connecting terminal;

filling each of the holes with a metal to thereby form a conduit therein, to thereby form an array of M×N semifinished actuated mirrors;

semi-dicing the active matrix by forming an incision at the active matrix;

covering completely each of the semifinished actuated mirrors with a thin film protection layer;

removing the thin film sacrificial layer using an etchant or a chemical, wherein the etchant or the chemical is inserted into the etching aperture in each of the semifinished actuated mirrors and gaps between the semifinished actuated mirrors;

removing the thin film protection layer; and dicing completely the active matrix into a desired shape to thereby form the array of M×N thin film actuated mirrors.

5. The method of claim 4, wherein the passivation layer is made of a phosphor-silicate glass (PSG) os silicon nitride.

6. The method of claim 5, wherein the passivation layer is formed in a thickness of 0.1–2 μm.

7. The method of claim 6, wherein the passivation layer is formed by using a CVD or a spin coating method.

8. The method of claim 4, wherein the etchant stopping layer is made of silicon nitride.

9. The method of claim 8, wherein the etchant stopping layer is formed in a thickness of 0.1–2 μm.

10. The method of claim 9, wherein the etchant stopping layer is formed by using a sputtering or a CVD method.

11. The method of claim 8, wherein the thin film electro-displacive layer is heat treated by using a rapid thermal annealing (RTA) method.

12. The method of claim 4, wherein the top surface of the thin film sacrificial layer is flattened by using a spin on glass (SOG) method or a chemical mechanical polishing (CMP) method, followed by a scrubbing method.

13. The method of claim 4, wherein the array of empty cavities is created by using a dry or a wet etching method.

14. The method of claim 4, wherein the second thin film layer is iso-cut by using a dry etching method.

15. The method of claim 4, wherein the incision at the active matrix is formed in a depth of one third of the thickness of the active matrix.

16. The method of claim 4, wherein the incision is formed by using a photolithography method.

17. The method of claim 4, wherein the active matrix is completely diced by using a photolithography or a laser trimming method.

* * * * *